US012188425B2

(12) United States Patent
Zhang et al.

(10) Patent No.: US 12,188,425 B2
(45) Date of Patent: Jan. 7, 2025

(54) DETERMINING THE SIZE OF A LEAK IN A FUEL TANK SYSTEM

(71) Applicant: Vitesco Technologies GmbH, Regensburg (DE)

(72) Inventors: Hong Zhang, Tegernheim (DE); Gerhard Haft, Maxhütte-Haidhof (DE)

(73) Assignee: Vitesco Technologies GmbH, Regensburg (DE)

( * ) Notice: Subject to any disclaimer, the term of this patent is extended or adjusted under 35 U.S.C. 154(b) by 122 days.

(21) Appl. No.: 17/807,031

(22) Filed: Jun. 15, 2022

(65) Prior Publication Data

US 2022/0307439 A1    Sep. 29, 2022

Related U.S. Application Data

(63) Continuation of application No. PCT/EP2020/082510, filed on Nov. 18, 2020.

(30) Foreign Application Priority Data

Dec. 16, 2019   (DE) .................... 10 2019 219 762.0

(51) Int. Cl.
*F02D 41/22* (2006.01)
*G01M 3/32* (2006.01)

(52) U.S. Cl.
CPC .......... *F02D 41/22* (2013.01); *G01M 3/3272* (2013.01); *F02D 2041/225* (2013.01); *F02D 2200/0602* (2013.01); *F02D 2200/0606* (2013.01)

(58) Field of Classification Search
CPC .............. F02M 25/08; F02M 25/0809; F02M 25/0836; F02M 25/0854; F02D 41/22;
(Continued)

(56) References Cited

U.S. PATENT DOCUMENTS 6,308,559 B1    10/2001   Davison et al.
6,321,727 B1 *  11/2001   Reddy ............... F02M 25/0809
                                                      123/520
(Continued)

FOREIGN PATENT DOCUMENTS

DE          10122058 A1    12/2001
DE       102018204717 B3     8/2019

OTHER PUBLICATIONS

International Search Report and Written Opinion dated Feb. 23, 2021 from corresponding International Patent Application No. PCT/EP2020/082510.
(Continued)

*Primary Examiner* — Logan M Kraft
*Assistant Examiner* — Johnny H Hoang

(57) ABSTRACT

The disclosure relates to a method for determining a size of a leak in a fuel tank system. The method includes: starting an internal combustion engine; calculating a stoppage time for a vehicle and/or a temperature difference between the fuel in the fuel tank system and the environment; and checking whether at least one of a plurality of diagnostic conditions is fulfilled. A first diagnostic condition is fulfilled when the stoppage time is longer than a predetermined minimum stoppage time. A second diagnostic condition is fulfilled when the temperature difference is smaller than a predetermined maximum temperature difference. Additionally, when at least one of the plurality of diagnostic conditions is fulfilled, the method includes: evacuating the fuel tank system; recording a time profile of the pressure in the fuel tank system; and determining the size of a leak based on the recorded time profile of the pressure.

10 Claims, 1 Drawing Sheet

(58) Field of Classification Search
CPC ....... F02D 2041/225; F02D 2200/0602; F02D 2200/0606; G01M 3/32; G01M 3/3272
USPC ..... 123/516–520, 198 D; 701/102, 114, 115; 73/114.41, 114.57
See application file for complete search history.

(56) References Cited

U.S. PATENT DOCUMENTS

| | | | |
|---|---|---|---|
| 9,297,340 B2* | 3/2016 | Pearce | F02M 25/0809 |
| 11,274,622 B1* | 3/2022 | Dudar | F02D 41/22 |
| 2001/0029933 A1 | 10/2001 | Fabre | |
| 2006/0283237 A1* | 12/2006 | Courrieu | G01M 3/3236 |
| | | | 73/40.5 R |
| 2007/0068227 A1* | 3/2007 | Tsuyuki | F02M 25/0809 |
| | | | 73/49.7 |
| 2007/0199372 A1* | 8/2007 | Annoura | F02M 25/089 |
| | | | 73/114.38 |
| 2010/0064774 A1* | 3/2010 | Drane | F02M 25/0818 |
| | | | 73/40 |
| 2014/0026866 A1* | 1/2014 | Pifher | B60K 15/01 |
| | | | 123/520 |
| 2015/0083087 A1* | 3/2015 | Pearce | F02M 25/0809 |
| | | | 123/520 |
| 2015/0198103 A1* | 7/2015 | Dudar | F02M 25/0809 |
| | | | 701/102 |

OTHER PUBLICATIONS

German Office Action dated Aug. 28, 2020 for corresponding German Patent Application No. 10 2019 219 762.0.

* cited by examiner

DETERMINING THE SIZE OF A LEAK IN A FUEL TANK SYSTEM

CROSS-REFERENCE TO RELATED APPLICATIONS

This application claims the benefit of PCT Application PCT/EP2020/082510, filed Nov. 18, 2020, which claims priority to German Application 10 2019 219 762.0, filed Dec. 16, 2019. The disclosures of the above applications are incorporated herein by reference.

TECHNICAL FIELD

The disclosure relates to the technical field of vehicle diagnostics. More specifically, the disclosure relates to a method and a device for determining the size of a leak in a fuel tank system of a vehicle having an internal combustion engine. The disclosure also relates to an engine controller and to a computer program.

BACKGROUND

Various methods for detecting leakages in fuel tanks are known, for example the NVLD method (NVLD=Natural Vacuum Leakage Detection) and the LDV method (LDV=Leakage Detection by Vacuum).

In the case of the NVLD method, the entire system is shut off on the fresh-air-supply side with the aid of spring-loaded non-return valves. By way of a membrane, the non-return valves are configured such that, with a minimum overpressure in the tank (>1-2 hPa relative to the environment), the valve opens automatically, whilst, with a negative pressure, it only opens at a differential pressure of more than 10 hPa. Furthermore, not only is the membrane located in the so-called NVLD module, but also an electrical contact, which closes at a certain negative pressure. The diagnostics by way of NVLD are carried out when the internal combustion engine is stationary and over a time period of several hours. This makes use of the fact that the tank usually cools down after stopping the internal combustion engine (e.g., as a result of the cold during the night). This leads to a decrease in the pressure in the tank, i.e., to a natural vacuum. If the system is leak-tight and the temperature decrease is great enough, then sufficient negative pressure is produced to close the switching contact in the NVLD. A small electronic system, which permanently monitors the temperature and the switching contact, then informs the engine controller upon the next engine start whether the temperature change was sufficient and whether the switching contact was closed. If the system is not sufficiently leak-tight, then the switch does not close, although the temperature decrease would have been sufficient. In this case, the system is assessed as having a leak.

In the case of the LDV method, the negative pressure in the tank system is generated externally. For example, by the vehicle engine or, in the case of active scavenging air systems, by the scavenging air pump. To this end, the fresh air supply of the system must be closed via a shut-off valve. To record the extent of the current evaporation of the fuel, the pressure is measured in the closed system. The vehicle engine or the scavenging air pump then sucks gases from the system via the tank vent valve (TEV) and the TEV is also closed when sufficient negative pressure has built up. The system is now leak-tight and the negative pressure should remain constant if there is no leakage and therefore fuel does not evaporate. The pressure profile in the system is measured and it is possible to draw conclusions relating to the size of a leak from the measured pressure increase. In order to generate the negative pressure, a small proportion of gases must therefore be sucked from the tank system. Since these gases from the system fundamentally contain fuel vapors, they must not be blown into the environment. For this reason, they are supplied to the vehicle engine in order to be burned there. The vehicle engine must therefore be running. A running engine means that the vehicle is in a driving cycle and is, for example, moving. The movement in turn leads to the fuel sloshing back and forth in the tank. The exhaust gas system often extends closely past the tank so that the tank has different temperatures at different points. The sloshing around of the tank contents may therefore lead to pressure changes as a result of the evaporation of fuel. For this reason, accurate identification of a relatively small hole (e.g., smaller than or equal to 0.5 mm) is very difficult whilst the vehicle is moving. This type of diagnostics is therefore usually carried out in idling mode. However, in modern vehicles, sufficiently long idling phases seldom occur due to the stop/start operation, which is why the diagnostics may often not be carried out. So as to be able to run the diagnostics, the stop/start operation must be prevented, which of course increases the consumption.

SUMMARY

The present disclosure enables reliable identification of small tank leaks to be carried out on a regular basis and without increased fuel consumption.

A first aspect of the disclosure provides a method for determining the size of a leak in a fuel tank system of a vehicle having an internal combustion engine. The described method includes the following: (a) starting the internal combustion engine, (b) calculating a stoppage time for the vehicle and/or a temperature difference between the fuel in the fuel tank system and the vehicle environment, (c) checking whether at least one of a plurality of diagnostic conditions is fulfilled, where a first diagnostic condition of the plurality of diagnostic conditions is fulfilled if the stoppage time is longer than a predetermined minimum stoppage time, and where a second diagnostic condition of the plurality of diagnostic conditions is fulfilled if the temperature difference is smaller than a predetermined maximum temperature difference, and (d), if at least one of the plurality of diagnostic conditions is fulfilled, carrying out the following steps: (d1) shutting off the fuel tank system (d2), waiting until a predetermined waiting time has elapsed, (d3) evacuating the fuel tank system, (d4) recording a time profile of the pressure in the fuel tank system and (d5) determining the size of a leak in the fuel tank system based on the recorded time profile of the pressure.

The described method is based on the knowledge that the LDV method described at the outset can be used in a particularly reliable, environmentally friendly and precise manner if the fuel in the fuel tank system is stable and calm, i.e., in particular not moving, and has a temperature which is as close to the ambient temperature as possible. Whether or not this is the case is established according to the disclosure by checking whether one or more diagnostic conditions are fulfilled. Only when at least one of these diagnostic conditions is fulfilled is the actual LDV method carried out, i.e., the fresh air supply of the fuel tank system is closed/shut off (for example by a shut-off valve or latching valve), then, after a short waiting time (during which fuel can evaporate), the fuel tank system is evacuated so that a vacuum is produced, and then (when the fuel tank system is closed) the time profile of the pressure in the fuel tank system is recorded. If the fuel tank system is completely leak-tight, the pressure will remain substantially constant. However, if a leak is present, the recorded pressure profile will show a corresponding pressure increase.

In some implementations, the determination of the size of the leak includes calculating a gradient of the time profile of the pressure.

The gradient, i.e., the time rate of the pressure increase, is directly associated with the size of the leak.

In some examples, the evacuation of the fuel tank system has been carried out when the pressure in the fuel tank system has been reduced by a predetermined amount.

In other words, evacuation takes place until the pressure in the fuel tank system has been reduced by the predetermined amount.

In some implementations, the predetermined amount is between 5 mbar and 15 mbar, for example, between 8 mbar and 12 mbar, such as around 10 mbar.

In some examples, the evacuation takes place via suction by the internal combustion engine or a scavenging air pump.

Additional components for establishing the vacuum are therefore not required.

In some implementations, a third diagnostic condition of the plurality of diagnostic conditions is fulfilled if an idling phase with a predetermined duration is implemented.

For legal reasons, for example, an idling phase of this kind can be implemented automatically by the engine controller directly after a cold start in order to reduce emissions.

In some examples, a fourth diagnostic condition of the plurality of diagnostic conditions is fulfilled if the internal combustion engine is operated in idling mode and stop-start prevention is realized.

In this state, there is sufficient time to carry out the inventive method.

A second aspect of the disclosure provides an engine controller for a vehicle having an internal combustion engine is described. The described engine controller is developed for carrying out the method according to the first aspect and/or one of the above examples.

The described engine controller is based substantially on the same idea as the above-described method according to the first aspect.

A third aspect of the disclosure provides a computer program having computer-executable commands which, when executed by a processor, are developed for carrying out the method according to the first aspect and/or one of the above exemplary examples.

Within the meaning of this document, the designation of a computer program of this kind is equivalent to the concept of a program element, a computer program product and/or a computer-readable medium which contains instructions for controlling a computer system, in order to coordinate the manner of operation of a system or of a method in a suitable manner, in order to achieve the effects associated with the method according to the disclosure.

The computer program can be implemented as a computer-readable instruction code in any suitable programming language, such as in JAVA, C++, etc. for example. The computer program can be stored on a computer-readable storage medium (CD-ROM, DVD, Blu-ray disk, removable drive, volatile or non-volatile memory, built-in memory/processor etc.). The instruction code can program a computer or other programmable devices such as, for example, a control unit for an engine of a motor vehicle in such a way that the desired functions are executed. Furthermore, the computer program may be provided in a network such as, for example, the Internet, from which a user can download it as required.

The disclosure can be implemented both by a computer program, i.e., software, and by one or more specific electrical circuits, i.e., as hardware or in any desired hybrid form, i.e., by software components and hardware components.

It should be noted that examples of the disclosure have been described with reference to different subjects of the disclosure. In particular, some examples of the disclosure are described by way of method claims and other examples of the disclosure are described by way of device claims. However, it will become immediately clear to a person skilled in the art on reading this application that, unless explicitly stated otherwise, in addition to a combination of features which are associated with one type of subject matter of the disclosure, any combination of features which are associated with different types of subjects of the disclosure is also possible.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
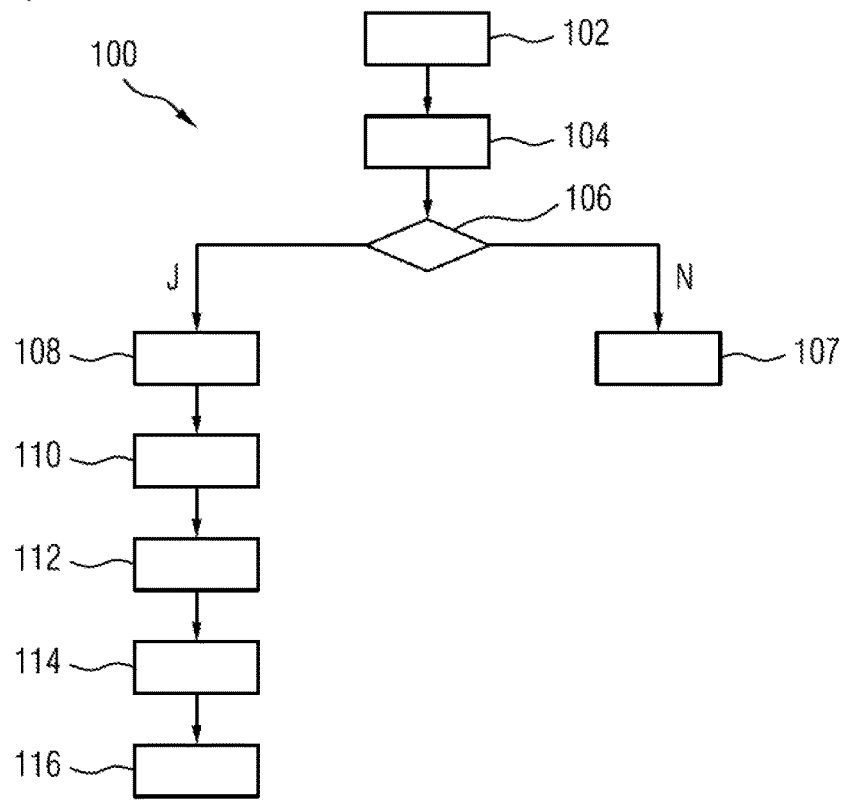
FIG. 1 shows a flowchart of a method according to the disclosure.

FIG. 1 shows a flowchart of an exemplary method 100 for determining the size of a leak in a fuel tank system of a vehicle having an internal combustion engine. The internal combustion engine of the vehicle is started at 102 and one or more parameter values, which are significant for the further method sequence, are calculated at 104. These parameter values can be a stoppage time of the vehicle, i.e., how long the vehicle was switched off before starting 102, and/or a difference between the fuel temperature in the tank system and the ambient temperature. It is important that an indication of the calmness and stability of the fuel in the tank can be derived from the parameter value(s). Then (using the calculated parameter values) it is checked at 106 whether at least one of a plurality of diagnostic conditions is fulfilled. A first diagnostic condition of the plurality of diagnostic conditions is fulfilled for example if the stoppage time is longer than a predetermined minimum stoppage time. A second diagnostic condition of the plurality of diagnostic conditions is fulfilled, for example, if the temperature difference is smaller than a predetermined maximum temperature difference. A third diagnostic condition of the plurality of diagnostic conditions is fulfilled, for example, if an idling phase of the internal combustion engine with a predetermined duration is implemented. A fourth diagnostic condition of the plurality of diagnostic conditions is fulfilled, for example, if the internal combustion engine is operated in idling mode and stop-start prevention is realized. If one or more of these diagnostic conditions is fulfilled, it can be assumed that the fuel has been calm for a while and that an LDV analysis can be carried out.

If none of the diagnostic conditions is fulfilled (N=NO at 106), the method ends (at least temporarily) at 107, where it can of course be restarted at a later time. If at least one of the plurality of diagnostic conditions is fulfilled (J=YES at 106), then an LDV method having the steps described below is carried out. The fresh air supply of the fuel tank system is closed at 108 by closing the electrically actuated shut-off valve. After the fresh air supply has been shut off, there is a wait at 110 until a predetermined waiting time has elapsed so that the evaporation of fuel can possibly take place. The evaporation rate can be determined by a pressure measurement. The fuel tank system is then evacuated at 112 in that gases are sucked from the tank system via the tank vent valve TEV by the internal combustion engine or by a scavenging air pump. The suction takes place until the pressure is reduced by a predetermined amount, for example 10 mbar. The time profile of the pressure in the fuel tank system is then recorded at 114 and the size of a leak in the fuel tank system is determined at 116 based on the recorded time profile of the pressure, for example, based on a gradient of the time-dependent pressure profile. The greater the gradient, the greater the leak. However, if the gradient corresponds to the previously determined evaporation rate, there is no leak.

The method 100 just described can be carried out directly by the engine controller with the aid of hardware which is already present (for example pressure sensor, shut-off valve, vent valve and scavenging air pump).

Figure 2:
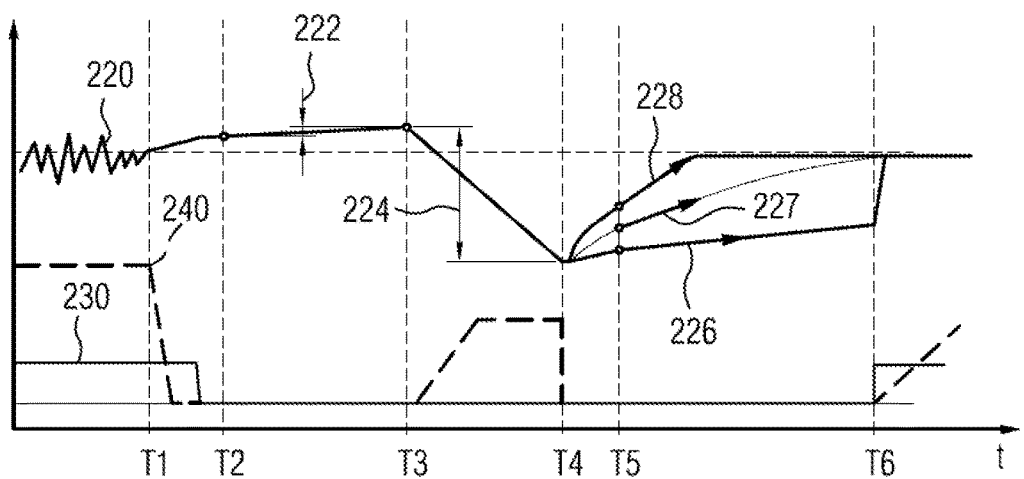
FIG. 2 shows time profiles of pressure and control signals whilst carrying out the method shown in FIG. 1.

FIG. 2 shows time profiles of pressure 220 and a control signal 230 for a shut-off valve and a control signal 240 for a scavenging air pump when carrying out the method shown in FIG. 1. Up to the time T1, the vehicle travels with an open shut-off valve and active scavenging air pump, where the pressure 220 in the fuel system varies. At time T1, the vehicle is stopped (or halted and switched to idling mode), i.e., the tank vent valve is closed, the scavenging air pump is deactivated and the shut-off valve is then closed. At time T2, the above-described waiting 110 begins. During this time, the pressure 220 increases by an amount 222 until the end of the waiting at time T3. The above-described evacuation 112 of the fuel tank system now begins in that the scavenging air pump is reactivated and the tank vent valve is opened. At time T4, the desired negative pressure 224, of for example 10 mbar, is achieved and the scavenging air pump and the tank vent valve are stopped again. The pressure 220 in the still closed system then increases to a greater or lesser extent owing to vaporization and a possible leak. In this case, FIG. 2 shows three possible pressure profiles 226, 227, 228 from time T5, which each correspond to different situations. The flat profile 226 has an increase or gradient which is comparable with the pressure increase measured between time T2 and time T3 due to evaporation. In this case, it is concluded that there is no leak. The somewhat steeper profile 227 exceeds the measured evaporation rate and corresponds for example to a leak size of 0.5 mm. The steepest profile 228 also exceeds the measured evaporation rate and corresponds for example to a leak size of 1 mm. At time T6, the shut-off valve of the fresh air supply is reopened and the scavenging air pump and the tank vent valve are reactivated.

A number of implementations have been described. Nevertheless, it will be understood that various modifications may be made without departing from the spirit and scope of the disclosure. Accordingly, other implementations are within the scope of the following claims.

What is claimed is:

1. A method for determining a size of a leak in a fuel tank system of a vehicle having an internal combustion engine, the method comprising:
    starting the internal combustion engine;
    determining a stoppage time for the vehicle, the stoppage time being a length of time the vehicle was switched off before starting;
    calculating a temperature difference between the fuel in the fuel tank system and a vehicle environment;
    checking whether at least two of a plurality of diagnostic conditions are fulfilled, wherein:
        a first diagnostic condition of the plurality of diagnostic is fulfilled when the stoppage is longer than a predetermined minimum stoppage time,
        a second diagnostic condition of the plurality of diagnostic conditions is fulfilled when the temperature difference is smaller than a predetermined maximum temperature difference, and
        when the at least two of the plurality of diagnostic conditions are fulfilled, carrying out the following steps:
            shutting off the fuel tank system,
            waiting until a predetermined waiting time has elapsed,
            evacuating the fuel tank system,
            recording a time profile of a pressure in the fuel tank system; and
            determining the size of a leak in the fuel tank system based on the recorded time profile of the pressure.

2. The method of claim 1, wherein the determination of the size of the leak comprises calculating a gradient of the time profile of the pressure.

3. The method of claim 1, wherein the evacuation of the fuel tank system is carried out when the pressure in the fuel tank system is reduced by a predetermined amount.

4. The method of claim 3, wherein the predetermined amount is between 5 mbar and 15 mbar.

5. The method of claim 1, wherein the evacuation take place via suction by the internal combustion engine or a scavenging air pump.

6. The method of claim 1, wherein a third diagnostic condition of the plurality of diagnostic conditions is checked, the third diagnostic condition is fulfilled when an idling phase with a predetermined duration is implemented.

7. The method of claim 1, wherein a fourth diagnostic condition of the plurality of diagnostic conditions is checked, the fourth diagnostic condition is fulfilled when the internal combustion engine is operated in idling mode and stop-start prevention is realized.

8. A computer program having computer-executable commands which, when executed by a processor, are developed for carrying out the method as claimed in claim 1.

9. An engine controller for a vehicle having an internal combustion engine, which is developed for carrying out a method for determining a size of a leak in a fuel tank system of a vehicle having an internal combustion engine, the method comprising:
    starting the internal combustion engine;
    determining a stoppage time for the vehicle, the stoppage time being a length of time the vehicle was switched off before starting;
    calculating a temperature difference between the fuel in the fuel tank system and a vehicle environment;
    checking whether at least two of a plurality of diagnostic conditions are fulfilled, wherein:

a first diagnostic condition of the plurality of diagnostic conditions is checked, the first diagnostic condition is fulfilled when the stoppage is longer than a predetermined minimum stoppage time, a second diagnostic condition of the plurality of diagnostic conditions is fulfilled when the temperature difference is smaller than a predetermined maximum temperature difference, and when the at least two of the plurality of diagnostic conditions are fulfilled, carrying out the following steps:

shutting off the fuel tank system, waiting until a predetermined waiting time has elapsed, evacuating the fuel tank system, recording a time profile of a pressure in the fuel tank system; and determining the size of a leak in the fuel tank system based on the recorded time profile of the pressure.

10. A method for determining a size of a leak in a fuel tank system of a vehicle having an internal combustion engine, the method comprising:

starting the internal combustion engine;

calculating a temperature difference between the fuel in the fuel tank system and a vehicle environment; and checking whether at least one of a plurality of diagnostic condition is fulfilled, the at least one diagnostic condition of the plurality of diagnostic conditions is fulfilled when the temperature difference is smaller than a predetermined maximum temperature difference, wherein when the at least one of the plurality of diagnostic conditions is fulfilled, carrying out the following steps:

shutting off the fuel tank system, waiting until a predetermined waiting time has elapsed, evacuating the fuel tank system, recording a time profile of a pressure in the fuel tank system; and determining the size of a leak in the fuel tank system based on the recorded time profile of the pressure.

* * * * *